May 19, 1959     R. GROSS     2,887,008
SPECTACLE FRAME CONSTRUCTION
Filed March 29, 1954     2 Sheets-Sheet 1
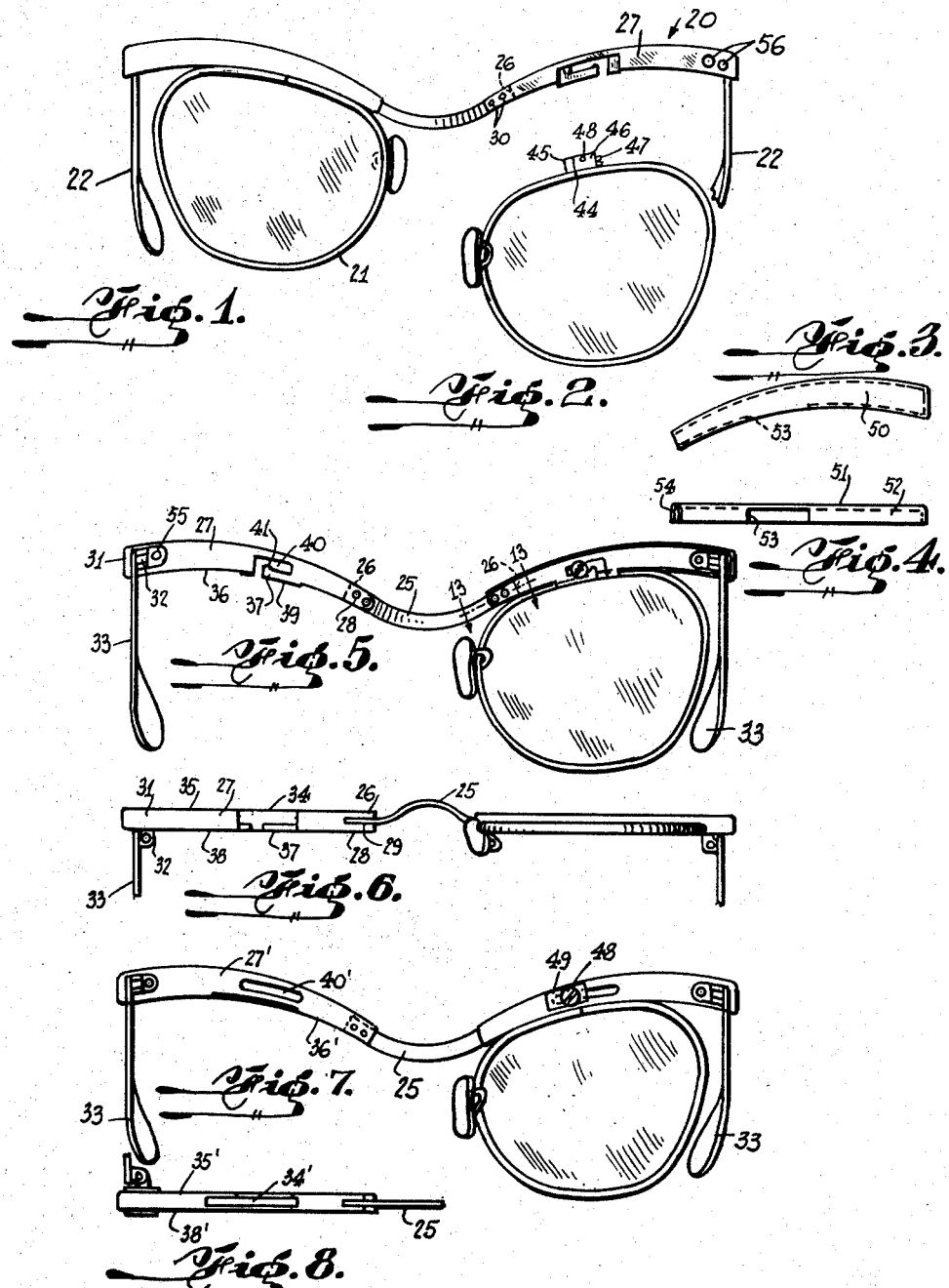
INVENTOR.
ROBERT GROSS.
BY *Percy Freeman*
ATTORNEY.

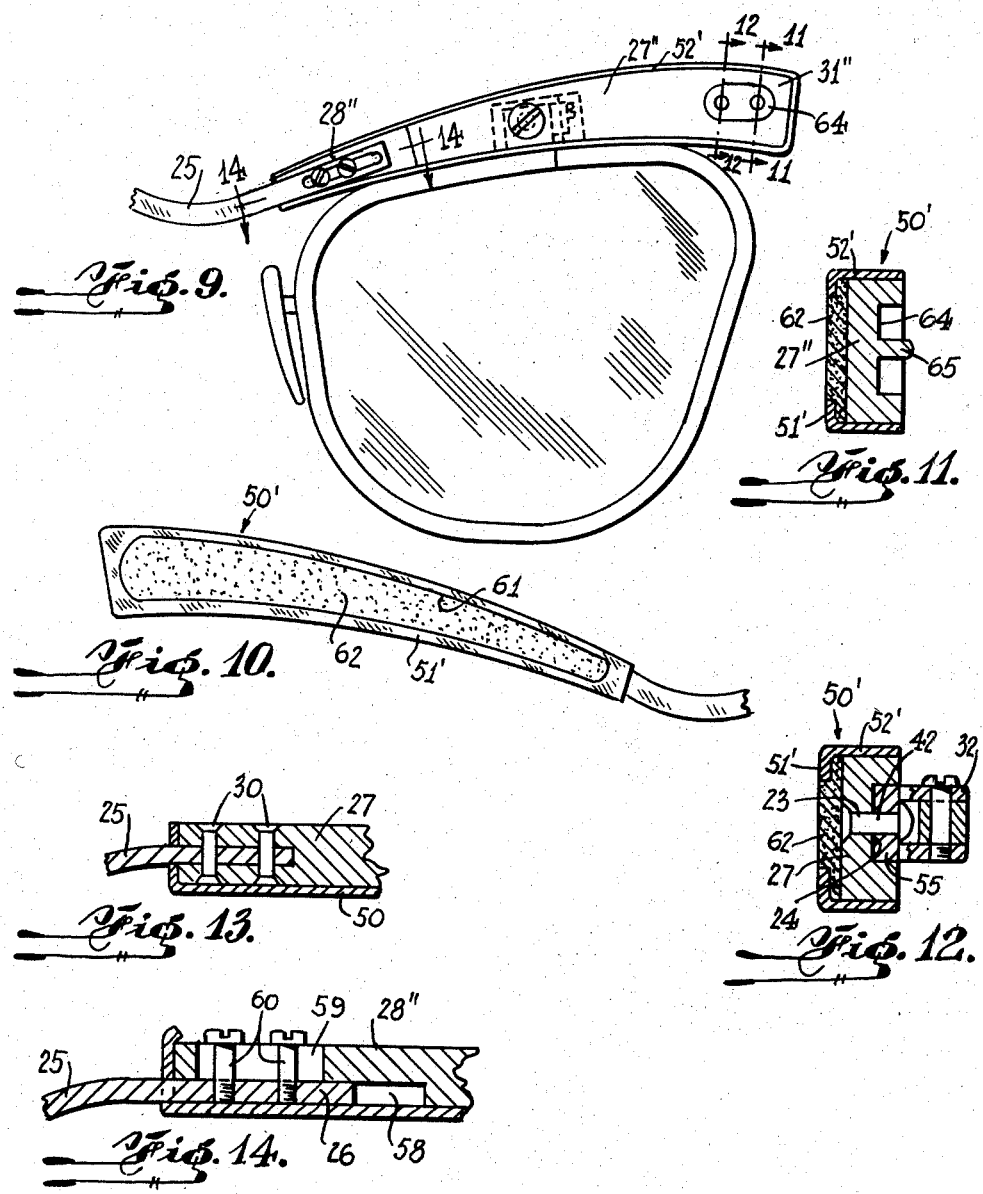

United States Patent Office 2,887,008
Patented May 19, 1959

2,887,008

SPECTACLE FRAME CONSTRUCTION

Robert Gross, Hackensack, N.J., assignor to Hudson Optical Corporation, New York, N.Y., a corporation of New York Application March 29, 1954, Serial No. 419,131

1 Claim. (Cl. 88—41)

This invention relates generally to spectacle frames, and is particularly directed to spectacle frames or ophthalmic mountings in which the lenses or eye wires may be moved toward and away from each other to selectively determine the interpupillary distance. The invention also embraces certain novel methods in the art of manufacturing spectacle frames.

The particular embodiments of the present invention, which are illustrated in the drawings and which will be described hereinafter in greater detail, comprise generally a pair of brow pieces and a bridge member connected together in end-to-end relation, an eye wire connected to each of the brow pieces, and temples hingedly connected to remote portions of the brow pieces.

There are, of course, many spectacle frame constructions of adjustable interpupillary distance on the market and in the prior art, but such devices are subject to numerous difficulties. For example, prior spectacle frame constructions of this general type have been bulky and unattractive in appearance, and extremely difficult to properly adjust. Further, such constructions have been necessarily fragile, and therefore readily subject to breakage under normal conditions of use.

Accordingly, it is a principal object of the present invention to provide a spectacle frame construction of the type described which is simple in construction and operation, which is durable in use, and which is capable of manufacture in a wide variety of attractive styles, unmarred in appearance by exposed adjustable mechanisms.

It is another object of the present invention to provide a spectacle frame construction having the characteristics mentioned in the foregoing paragraph, in which the brow pieces are adapted to be quickly and easily decorated with any desired covering material, so as to harmonize in color and theme with the apparel ensemble of the wearer, and which decorating or ornamental materials may be simply and quickly interchanged, without the exercise of more than ordinary skill, to present any desired ornamental effect.

It is still another object of the present invention to provide a method of manufacturing spectacle frames of the type described, which is extremely simple and efficient, and which is capable of use with economical, mass production techniques. More specifically, the present invention provides a method of attaching the temple hinges to the brow pieces with a minimum of parts and operations, so as to more rapidly and firmly secure the hinge in position.

It is a further object of the present invention to provide a spectacle frame construction of the type described which includes adjustable means connecting the eye wires to the brow pieces so as to permit selective determination of the interpupillary distance, and which optionally includes adjustable means connecting the bridge and brow pieces, the latter connecting means permitting not only adjustment of the interpupillary distance, but also extension and contraction of the total frame width, with or without varying the interpupillary distance, so as to conform aesthetically with the factual contours of the wearer. That is, a single frame constructed in accordance with the principles of the present invention may be adjusted to conform aesthetically with a wide variety of facial types, as well as to accommodate for different interpupillary distances.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claim.

In the drawings:

Fig. 1 is a front elevational view showing spectacle frames constructed in accordance with the present invention, with parts removed for purposes of clarity.

Fig. 2 is a front elevational view showing an eye wire adapted for use with the spectacle frame of Fig. 1.

Fig. 3 is a front elevational view showing a brow piece cover for use with the frame of Fig. 1.

Fig. 4 is a bottom plan view of the brow piece cover of Fig. 3.

Fig. 5 is a rear elevational view showing the spectacle frame of Fig. 1.

Fig. 6 is a bottom plan view of the spectacle frame of Fig. 1.

Fig. 7 is a rear elevational view showing a slightly modified form of spectacle frame constructed in accordance with the present invention, with one eye wire removed for clarity of illustration.

Fig. 8 is a partial, bottom plan view of the spectacle frame illustrated in Fig. 7.

Fig. 9 is a partial, rear elevational view showing another slightly modified form of spectacle frame constructed in accordance with the present invention.

Fig. 10 is a front elevational view showing a slightly modified form of brow piece cover in accordance with the present invention.

Fig. 11 is a sectional view taken substantially along the line 11—11 of Fig. 9 and showing the brow piece before securement thereto of the temple hinge;

Fig. 12 is a sectional view similar to Fig. 11, showing an alternative means for securing the temple hinge to the brow piece.

Fig. 13 is a sectional view taken substantially along the line 13—13 of Fig. 5, showing one manner of connecting the brow piece and bridge member.

Fig. 14 is a sectional view taken substantially along the line 14—14 of Fig. 9, showing another form of connection between the brow piece and bridge member.

Referring now more particularly to the drawings, and specifically to Figs. 1-6 thereof, the embodiment of the invention illustrated therein comprises a front piece, generally designated 20, eye wires 21 depending from the front piece, and temples 22 hingedly connected to the opposite ends of the front piece.

The front piece 20 includes a central, downwardly and outwardly curved strip or bridge member 25 having oppositely extending end portions 26. The front piece further includes a pair of elongated, slightly curved brow pieces 27 each arranged in end-to-end relation with respect to opposite ends of the bridge member 25. That is, the brow pieces 27 each have one end 28 formed with an inwardly extending groove or cut-out portion 29 for receiving the adjacent end extension 26 of the bridge member 25. Rivets 30, or other suitable fastener means extend through the brow piece end portions 28 and bridge member end extension 26 to fixedly secure the same in their end-to-end relation. The remote ends 31 are provided with temple hinges 32 for pivotally supporting the temples 33, in a manner which will be described more fully hereinafter.

Spaced intermediate the ends 28 and 31 of the brow piece 27 is formed a longitudinally disposed recess portion 34 extending inwardly from the front face 35 of the brow piece and opening through the lower edge thereof 36. Thus, the recess or groove 34 defines a wall 37 of reduced thickness, flush with the rear brow piece face and extending slightly below the lower brow piece edge 36, as at 39, all for a purpose appearing presently. A bayonet slot 40 is formed in the wall 37 extending upwardly through the projecting edge 39, and thence, longitudinally of the brow piece 27 toward the end 28 thereof. A projection or tit 41 extends into the slot 40 to reduce or restrict the latter.

The eye wire 21 is split as at 44 and provided with a pair of abuttingly engageable upwardly projecting end lugs 45 and 46. Thus, when the eye wire 21 is closed, so as to retain a lens therein, the lugs 45 and 46 are in abutting engagement, forming an upwardly extending eye wire projection, and detachably secured together by a screw 47. A headed screw 48 extends forwardly into and in threaded engagement with the lug 46, so that the head of the screw 48 is disposed rearwardly of the eye wire projection. In order to connect the eye wire 21 to the brow piece 27, it is only necessary to insert the eye wire projection into the recess 34, the screw 48 moving upwardly into the slot 40 and laterally past the tit 41. The eye wire may then be adjusted longitudinally of the brow piece, and the screw 48 tightened to abut the rear face of the wall 37 and clamp the eye wire projection in the selected position. It will now be understood that the tit 41 will prevent inadvertent removal of the eye wire 21 from the slot 40, as it is necessary to raise the eye wire to permit movement of the screw 48 past the tit; and further, that the depending edge 39 of the wall 37 will abuttingly engage with the adjacent eye wire portion to stabilize the eye wire and rigidify the eye wire and brow piece connection. In manufacture, it has been found advantageous to die press the recess 34, which operation will simultaneously form the stabilizing edge projection 39.

The eye wire and brow piece connection is preferably concealed by a cover member 50, which includes a front wall 51 and peripheral edge flange 52. The cover front wall 51 is shaped to overlie the brow piece front surface 35, and the peripheral flange is formed with cut-away portions 53 and 54 for receiving the eye wire projection and bridge member, respectively. Thus, the flange 52 is adapted to substantially surround the brow piece, and may be provided with dimples, clasps, or other suitable means (not shown) for releasably retaining the cover member on the brow piece.

The higes 32 carry the temples 33 and include a hinge plate 55 secured to the brow pieces 27 by screws or rivets 56.

The form of the invention illustrated in Figs. 7 and 8 is substantially the same as that described hereinabove; however, each of the brow pieces 27' is formed with a longitudinally disposed, centrally located recess or groove 34' extending upwardly through the lower brow piece edge 36' and spaced from the front and rear brow piece faces 38' and 35'. Further, a longitudinally disposed slot 40' extends forwardly through the rear brow piece face 35' and opens into the groove 34'.

The eye wire projection, comprised of the lugs 45 and 46 as described hereinabove, is inserted in the groove 34', and shiftable therein longitudinally of the brow piece 27'. A closure plate 49 is preferably arranged over the slot 40' to prevent catching an eyelash or the like, and the screw 48 is extended through the plate 49 and threadedly into the eye wire projection. Thus, at any selected position of sliding movement of eye wire projection in the groove 34', the screw 48 may be tightened to clamp the eye wire in the desired position.

In both of the above described forms of the present invention, it will now be understood that the interpupillary distance of the spectacle frames may be selectively determined, and changed, as desired. Stated otherwise, the eye wires, and consequently the lenses, are movable toward and away from each other, and adapted to be fixed at any selected position of their movement, so that a single spectacle frame may be adjusted to various interpupillary distances.

In Figs. 9 and 14 are shown a slightly modified form of spectacle frame constructed in accordance with the present invention, wherein an adjustable connection is provided between the bridge 25 and brow piece end portion 28". The brow piece 27" is formed with a groove or recess 58 extending inwardly from its end 28" and opening through the front face thereof. An elongated, longitudinally extending, closed slot 59 extends forwardly through the rear brow piece face and opens into the groove 58. The end extension 26 of the bridge member 25 is received in the groove 58, and the threaded fasteners 60 extend forwardly through the slot 59 and threadedly into the extension 26. Thus, the bridge member extension 26 is slidable in the groove 58, limited only by engagement of the fastener 60 with the ends of the slot 59, and may be fixed at any selected position of its sliding movement by tightening of the fasteners so as to clamp the end extension against the brow piece. By this adjustable connecting means, the interpupillary distance may be varied without adjustment of the eye wire projection, or the total length of the front piece 20 may be changed, as for aesthetic effect, and the eye wire projections adjusted to the proper interpupillary distance.

The brow piece cover member 50' of Fig. 10 is substantially the same as that of Figs. 3 and 4, but is provided with a window or cut-out portion 61, which permits the exposure of an ornamental fabric, leather, or the like 62, for decorative purposes. By this construction, the decorative sheet 62 may be removed and replaced, as desired, by merely withdrawing the cover member 50' from the brow piece and changing the ornamental sheet. Hence, a single spectacle frame may be ornamented in a variety of ways to harmonize with different apparel, cosmetics or the like.

In Fig. 11 is shown the preferred method of securing the hinge plate 55 of the temple supporting hinge 32 to the brow piece, the brow piece 27" being shown for purposes of illustration. The brow piece is die-pressed to form a recess 64; and, the die employed (not shown) is provided with a pair of spaced apertures through which material of the brow piece is extruded to form the pins 65. The hinge plate 55 is then positioned in the recess 64 with the pins 65 extending through and beyond the plate; and, the projecting pin ends are swaged over the plate to fixedly secure the latter in the recess. This has been found, in practice, to provide a firm and durable connection at a substantially reduced cost.

Another method of securing the hinge plate 55 of the temple-supporting hinge 32 to the brow piece is illustrated in Fig. 12, wherein the brow piece 27 is formed with a recess 24 for conformably receiving the hinge plate, and further provided with through apertures 23 adapted to register with apertures of the hinge plate. Fasteners such as rivets or screws 42 are extended through the hinge plate and brow piece apertures 23 to secure the hinge plate in the recess 24.

From the foregoing, it is seen that the present invention provides spectacle frame constructions which fully accomplish its intended objects, and which are well adapted to meet practical conditions of manufacture and use. Of course, it is appreciated that the novel features of the various embodiments may be combined, as desired, without departing from the scope of the invention.

Although the present invention has been described in some detail by way of illustration and example for purposes of clarity of understanding, it is understood that certain changes and modifications may be made within the spirit of the invention and the scope of the appended claim.

Having thus described my invention, what I claim as new and desire to secure by Letters Patent, is:

A spectacle frame comprising a bridge member, a pair of browpieces arranged in end-to-end relation with respect to opposite ends of said bridge member and secured thereto, a pair of metallic eyewires for supporting a pair of lenses, each eyewire comprising a split ring having its split at its top, a clamping means for securing the adjacent ends of the eyewire together around a lens above said lens, and a fastener element threadedly engaged in said clamping means for detachably securing said clamping means to its respective browpiece with said eyewire and lens depending below said browpiece, each browpiece having a recess into which the associated eyewire clamping means extends, said recess extending inwardly from the front face of the browpiece intermediate its ends and of a size sufficient to slidably receive said clamping means, the rear wall of said recess having a slot extending longitudinally therethrough, said slot having an open angled end communicating with the lower edge of said rear wall to provide for entry of said clamping means, said fastener element defining a projection on each of said eyewires extending through its respective slot and relatively movable therein longitudinally thereof to vary the pupillary distance and to fix the clamping means at any selected position of its relative movement.

References Cited in the file of this patent

UNITED STATES PATENTS

| | | |
|---|---|---|
| 77,287 | Hunter | Apr. 28, 1868 |
| 932,978 | Frost | Aug. 31, 1909 |
| 1,017,579 | Nicol | Feb. 13, 1912 |
| 1,397,919 | Boutelle | Nov. 22, 1921 |
| 1,650,236 | Rollins | Nov. 22, 1927 |
| 1,744,282 | Rollins et al. | Jan. 21, 1930 |
| 2,302,100 | Bosworth | Nov. 17, 1942 |
| 2,356,148 | Cozzens et al. | Aug. 22, 1944 |
| 2,629,196 | Splaine | Feb. 24, 1953 |
| 2,655,835 | Salierno | Oct. 20, 1953 |
| 2,682,199 | Weissman | June 29, 1954 |
| 2,755,705 | Stegeman | July 24, 1956 |

FOREIGN PATENTS

| | | |
|---|---|---|
| 369,802 | Great Britain | Mar. 31, 1932 |
| 766,112 | France | Apr. 9, 1934 |
| 1,001,844 | France | Oct. 24, 1951 |